M. Burkhardt,
Clamp.
No. 97,872.  Patented Dec. 14, 1869.
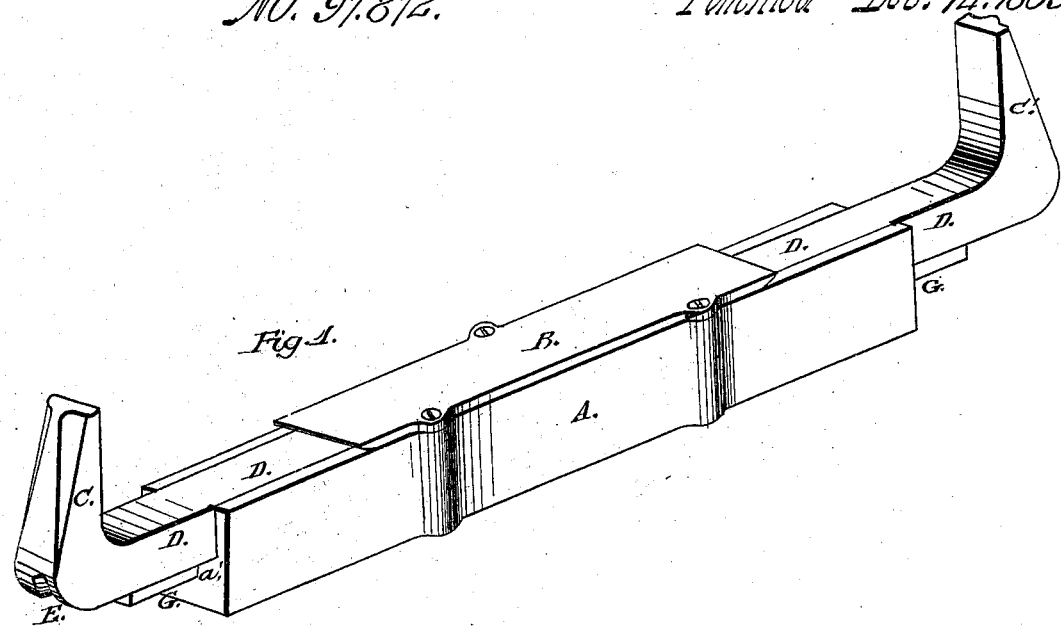
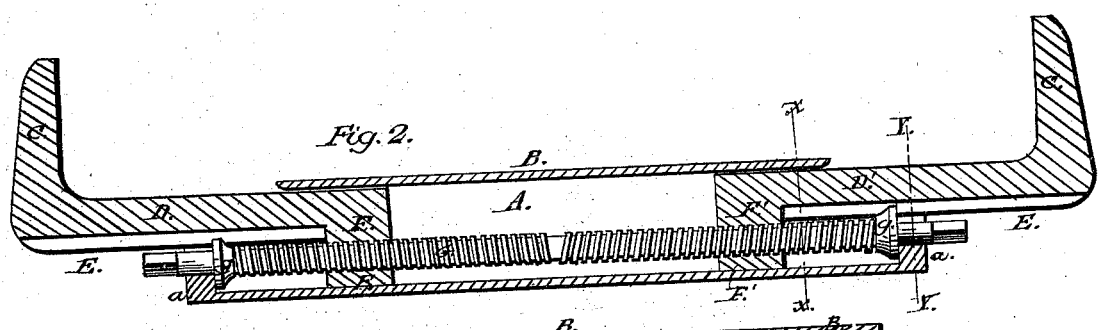
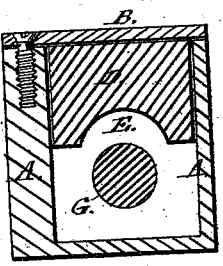 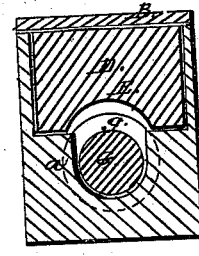
Witnesses:
Herman Merrell
E. E. Wood
Inventor:
Mo. G. Burkhardt

United States Patent Office.

MATHIAS G. BURKHARDT, OF CINCINNATI, OHIO.

Letters Patent No. 97,872, dated December 14, 1869.

IMPROVEMENT IN CLAMPS.

The Schedule referred to in these Letters Patent and making part of the same.

*To all whom it may concern:*

Be it known that I, MATHIAS G. BURKHARDT, of Cincinnati, Hamilton county, State of Ohio, have invented a certain new and useful Improved Clamp, for foundry and other mechanical uses; and I hereby declare the following to be a full, clear, and exact description thereof, reference being had to the accompanying drawings, making part of this specification.

The nature of my invention consists in constructing a clamp with a rectangular head, peculiarly-constructed jaws, connected to grooved arms, to slide back and forth, to clutch or loosen the clamps, and using a right-handed and left-handed screw-rod, to contract and expand the jaws.

These jaws slide sufficiently loose in their head to have but little friction, while the several sides and bearings of the frame serve to stiffen the clamps, and relieve the jaws and screw-rod from strain.

In the accompanying drawings, illustrative of my invention—

Figure 1 is a perspective view.
Figure 2 is a longitudinal section.
Figure 3 is a cross-section through line X X.
Figure 4 is a cross-section through line Y Y.

To enable others skilled in the art to make and use my invention, I will describe its construction and operation.

A is the frame or bed, which is a rectangular box, preferably of cast-iron, the sides of which are of sufficient thickness to impart the necessary amount of strength.

The cap or cover B is fastened on substantially as shown.

I usually make the exterior of the box A two and three-quarter inches deep by two inches wide, and the sides and bottom of the same about one-quarter inch thick.

C C' are jaws, the shanks D D' of which have grooves E E' on the under side, and projections F F', which latter rest on the bottom of the box A, and slide easily between the sides of the same.

G is an iron rod, with a right and left-hand screw cut or chased upon it, meeting in the middle, and extending to the collars $g$ $g'$ at either end.

These screws pass through counter or female screws, cut in the projections F F'.

The collars $g$ $g'$ are slipped over the screws, and firmly fastened in the proper position.

They fit in between the bearings $a$ $a'$ of the box, and prevent the rod G from working backward and forward in the bed.

The ends of the rod G journal in bearings $a$ $a'$, and protrude through the ends of the bed sufficiently to provide for the attachment of a common wrench, which serves to revolve the rod and expand or contract the jaws.

The sides of the grooves E E' rest upon the ends of the box A, and the projections F F' upon the bottom of the same, the sides of the shanks D D' at the same time fitting the sides of the box and against the cover B, so that while the jaws are at any time capable of sliding easily within the box, they are fully supported at all points when in action.

The provision of the grooves E E' gives strength to the shanks D D', and locates the screw-rod G immediately under the jaws.

It is obvious that by reversing the jaws C C', and forming the projections F at the jaw-end of the shanks, the device can be used as a clamp and vise both.

By the provision of the right and left-hand screw on the rod G, the jaws C C' are brought together when the rod is revolved in one direction, and expanded when the movement of the rod is reversed.

The capacity of extension and contraction of the clamps C C' will be, of course, equal to the length of the rod G between the collars $g$ $g'$, less the width of projecting nuts F F.

The shape and dimensions of my device can be variously modified.

I do not claim, broadly, the jaw-arms sliding in a bed or frame; but

What I claim as my invention, and desire to secure by Letters Patent, is—

A clamp, composed of jaw-arms C D, screw-rod G, and box A, when constructed and arranged substantially as and for the purpose herein specified, shown, and described.

In testimony of which invention, I hereunto set my hand.

MATHIAS G. BURKHARDT.

Witnesses:
HERMAN MERRELL,
E. E. WOOD.